United States Patent Office 2,722,802
Patented Nov. 8, 1955

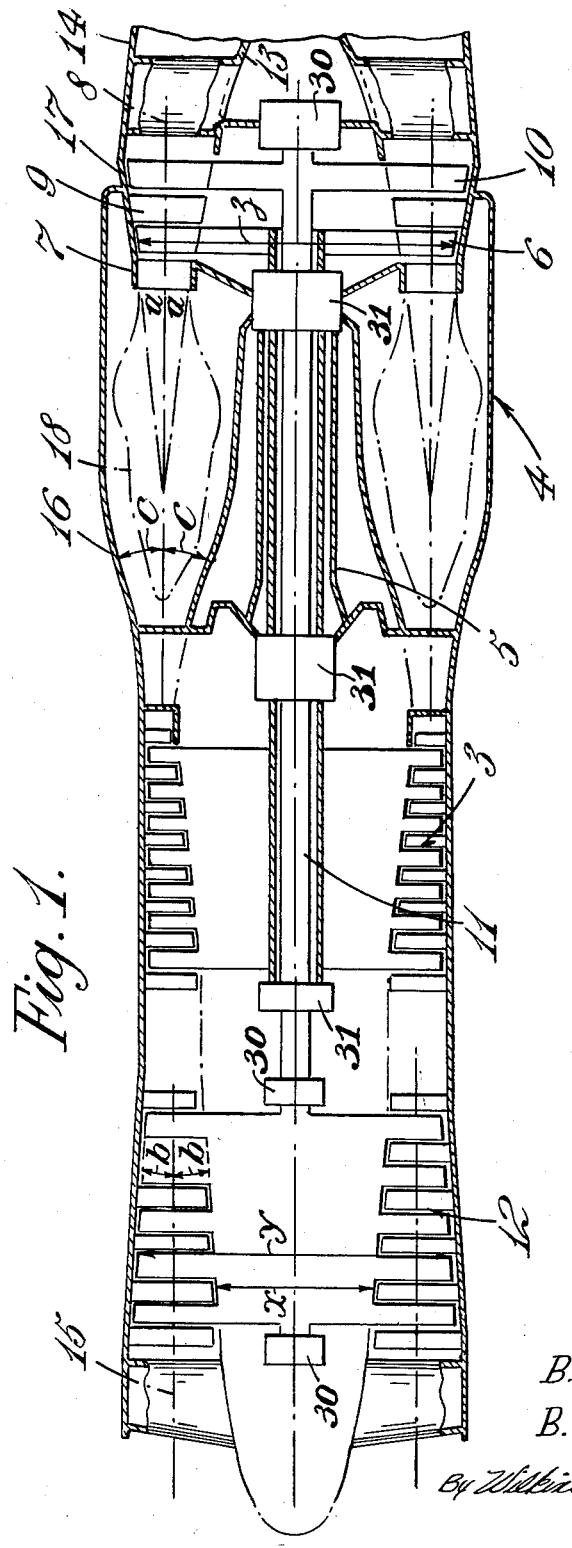

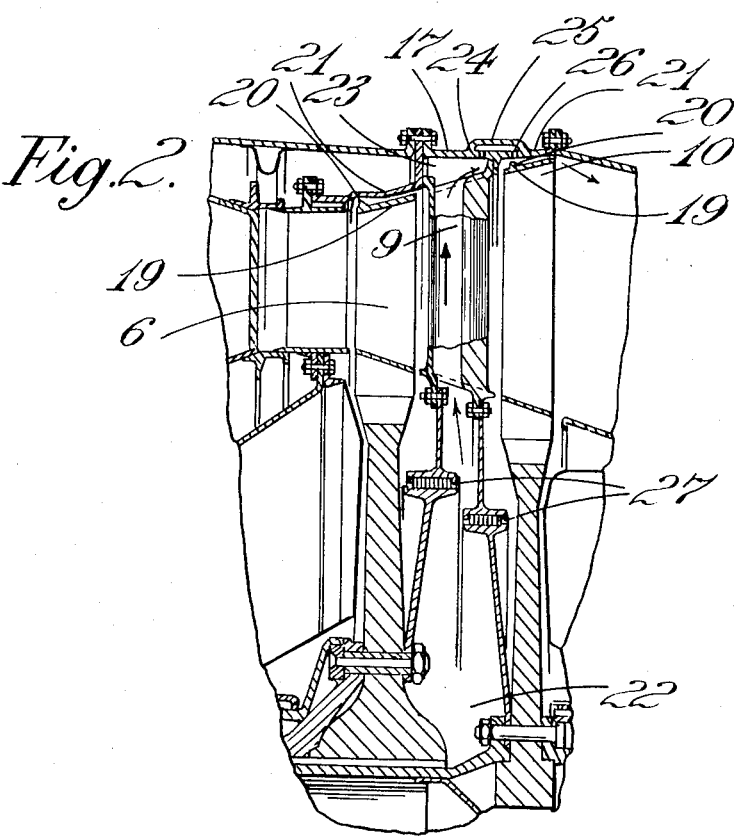

2,722,802

AXIAL FLOW TURBOJET ENGINES HAVING INDEPENDENTLY ROTATING LOW AND HIGH PRESSURE SYSTEMS

Basil Davenport Blackwell and Bertram Anthony Peaster, Bristol, England, assignors to The Bristol Aeroplane Company Limited, Bristol, England, a British company Application April 12, 1952, Serial No. 282,024

Claims priority, application Great Britain April 18, 1951

7 Claims. (Cl. 60—39.16)

This invention relates to turbo-jet engines for aircraft propulsion of the kind comprising independently rotating high and low-pressure axial flow turbines driving high and low-pressure axial flow compressors respectively which absorb substantially the whole power output of the turbines. The turbines also drive the engine auxiliaries and possibly aircraft accessories, but this represents only a small fraction of their output.

The principal reason for dividing a turbo-jet engine into high and low-pressure systems is that the greater bulk of the low pressure air and products of combustion necessitate flow passage annuli of larger cross sectional area and therefore greater outer diameter than is necessary for the high-pressure parts of the engine, but this possibility cannot be fully exploited unless the systems rotate independently since in the interest of efficiency it is necessary in each case to employ the highest practical tip speed, which moreover, being related to the speed of sound in the working medium, increases as the pressure and temperature rise.

The determination of the most suitable compounding power ratio between the high and low-pressure systems involves the relative assessment of a number of variables the more important of which are the number of stages of each turbine, the relative tip diameters of the turbines and compressors and the hub-tip ratio of the low-pressure compressor inlet.

For constructional simplicity and economy it is desirable to use single stage turbines for both the high-pressure and the low-pressure systems, while the maintenance of minimum frontal area necessitates the reduction of the hub tip ratio at the low-pressure compressor intake to the lowest practical value and at the same time imposes limitations upon the maximum diameter of the engine and of the low-pressure turbine rotor.

According to the present invention an axial flow turbojet engine comprises independently rotating single stage high and low-pressure turbines driving high and low-pressure compressors respectively in which the first row of moving blades of the low-pressure compressor has a hub-tip ratio between 0.4 and 0.5, the tip diameter of the low-pressure turbine is equal to or up to 10% greater than that of the said compressor blade row and the power absorbed by the high-pressure compressor is from 2 to 2.5 times that absorbed by the low pressure compressor.

The invention also includes certain features aiming to improve the efficiency of the engine as a whole and the turbines in particular by the maintenance of symmetrical flow conditions through the blading and the intervening chambers and the avoidance as far as possible of disturbance of the flow through the turbines by the admission of cooling air between blade rows.

To this end according to further features of the invention the blade rows of the turbine rotors and the intermediate guide blade row have substantially constant flare approximately equally disposed at the inner and outer boundaries of the annular gas passage, while the low-pressure compressor blade rows also preferably have substantially constant mean diameter. By "flared" is meant that the tip and root edges of the blades diverge in the direction of flow of gas through the turbine rotors.

The high-pressure compressor preferably has constant tip diameter approximately equal to the outer diameter of the annular air passage at the outlet of the low-pressure compressor and delivers air into an annular combustion chamber which swells out externally and internally approximately equally.

The moving turbine blades are preferably shrouded and to maintain a leakage control gap which is independent of axial location of the rotor a feature of the invention provides a cylindrical surface on the shroud or turbine casing and a similar surface or local projecting rim on the other of said parts, thus a frusto-conical shrouding ring may for example be provided with a rim around its leading edge side projecting radially outwardly to provide on its outer surface a cylindrical surface or edge spaced at a minimum running clearance from a cylindrical surface formed on the inside of the turbine casing.

A specific construction of an engine according to the invention will now be described, by way of example only, with reference to the accompanying drawings whereof:

Figure 1 is a diagrammatic sectional elevation of the engine, and

Figure 2 is a sectional elevation showing a detail of construction of the engine to a larger size.

Referring to the drawings: a seven stage axial flow high-pressure compressor 3 delivers air to an annular combustion chamber 4 surrounding a hollow driving shaft 5 between the compressor and a high-pressure single stage turbine 6 receiving the products of combustion. The flow path through the nozzle guide blades 7 preceding the turbine 6 is of parallel section in radial planes, but through the turbine moving blades it flares substantially equally by angle $a$ on either side of the mean radius 8, and this flare is maintained through a following row of stationary guide blades 9 and through the next adjacent moving blades of a single stage low-pressure turbine 10 the shaft 11 of which extends through the high-pressure turbine 6 and compressor assembly 3 to drive a five stage low-pressure compressor 12 at the forward end of the engine. After leaving the low-pressure turbine 10 the products of combustion flow between an exhaust bullet 13, which can be comparatively short by reason of the fact that the inner surface of the flow path is already convergent as it leaves the turbine, and an outer convergent casing 14 to the jet pipe and nozzle. The low pressure rotary system comprising compressor 12, shaft 11 and turbine 10 is supported on bearings 30 carried from the engine casing, and the high pressure rotary system comprising compressor 3, shaft 5 and turbine 6 is supported in bearings 31 likewise carried from the engine casing.

The low-pressure compressor has a hub-tip ratio $(x/y)$ of 0.45 at the first row of moving blades and this, together with the requirement of avoiding critical Mach numbers along the leading edges of the blades substantially fixes the tip diameter and speed of rotation of the compressor according to the power of the engine. The flow path through the low-pressure compressor blading is arranged to converge symmetrically by angle $b$ on either side of a mean radius 15, so that the stator casing tapers inwardly to form a waist facilitating the arrangement of auxiliary equipment externally of the engine.

From the outlet of the low-pressure compressor the air enters the high-pressure compressor, the flow path through which has a constant external diameter equal to that of the low pressure compressor outlet, and then enters the annular combustion chamber which again swells out externally and internally to approximately the same extent (by angle c on either side of the mean radius 8) so that the flow remains substantially symmetrical about the mean radius. Since the mean diameter of the high-pressure compressor outlet is well within the frontal diameter fixed by the inlet end of the low-pressure compressor, this disposition of the combustion chamber can be obtained without substantially increasing the overall diameter of the engine. This determines the maximum diameter of the turbine casings, and the low pressure turbine is constructed to this full diameter at the trailing edges of the blade tips. The determining factors of the design of the low-pressure turbine 10 are in general the avoidance of excessive Mach numbers and swirl at the entry to the exhaust ducting and of extreme blade profiles towards the roots involving re-compression of the gas. These factors limit the power which can be developed by the single stage low-pressure turbine at the determined tip diameter. Considerations already set forth determine the mean diameter of the blades of the high-pressure turbine and its speed of rotation, and its possible power output is limited principally by considerations of pressure ratio across the single row of moving blades, and the output swirl required to maintain reasonable convergence in the blade row. This outlet swirl, if excessive, results in high losses in the low pressure nozzle. A study of these considerations shows that a ratio of the powers absorbed by the low-pressure and high-pressure compressors of the order of 1:2.25 is possible without making serious concessions of efficiency in either system.

The inlet dimensions of the high-pressure turbine 6 having thus been fixed, the outer wall 16 of the gas passage diverges outwardly to the maximum diameter of the combustion chamber, so that between this position of maximum diameter and the casing 17 around the low-pressure turbine rotor a double walled construction can be provided receiving relatively cool air flowing over the outside of the flame casings 18 and constituting a heat barrier between the hot turbine casings and the outer casing of the engine.

The moving blades of both turbines 6 and 10 (see Figure 2) are provided with frusto-conical shrouds 19 the inner surfaces of which define the annular gas path through the blades, and to ensure a constant sealing clearance the shrouds are provided on their outer surfaces near their leading edges with a rim 20 projecting radially outwards into proximity with a cylindrical surface 21 formed on the interior of the casing 17, a suitable running clearance being of course maintained.

To cool the turbine rotors and their bearings compressed air is supplied by ducting from a compressed air source to the bearing housings and passes through hollow bolts or equivalent means into the space 22 between the turbine rotors. From this space the greater part of the air passes outwardly through hollow stationary guide blades 9 between the high and low-pressure moving blades into a cavity 23 through holes 24 into annular passage 25 and through holes 26 to be discharged downstream of the sealing gap between the low pressure moving blades and the casing so that most of the air passes over the outside of the shroud ring and joins the gas stream leaving the low pressure blades. Part of the air may however pass into the gas stream forwardly of the low pressure blades. The gaps between the high and low-pressure turbine blade and the hollow intermediate blades are sealed by separate labyrinth sealing assemblies 27 arranged well out towards the rims of the respective rotors. Such cooling air as leaks past these assemblies enters the gas stream through the aforesaid gaps, while should flow reversal occur in exceptional circumstances the hot gas does not flow over those parts of the turbine rotors within the radius of the sealing assemblies.

We claim:

1. An axial flow turbojet engine in which the mean direction of flow of working fluid past any moving blade is substantially free from radial components comprising a casing; an air intake in said casing; a low-pressure axial-flow compressor mounted in said casing, connected directly to said air intake to receive air therethrough and having a plurality of rows of moving blades whereof the first row has a hub tip ratio between 0.4 and 0.5; a high-pressure axial flow compressor mounted in said casing, connected directly to said low-pressure compressor to receive substantially the whole of the air compressed by said low-pressure compressor and having a plurality of rows of moving blades; combustion equipment mounted in said casing and connected directly to said high-pressure compressor to receive substantially the whole of the air compressed by said high-pressure compressor; a single-stage axial-flow high-pressure turbine mounted in said casing, connected directly to said combustion equipment to receive the products of combustion therefrom, and drivingly connected to said high-pressure compressor, the power developed by said high-pressure turbine being substantially wholly absorbed by said high-pressure compressor; and a single-stage axial-flow low-pressure turbine mounted in said casing, connected directly to said high-pressure turbine to receive the exhaust therefrom and drivingly connected to said low-pressure compressor, the power developed by said low-pressure turbine being substantially wholly absorbed by said low-pressure compressor; in which engine the ratio of the tip diameter of said low pressure turbine to the tip diameter of said first row of moving blades of said low pressure compressor is between 1 and 1.1; and the ratio between the power absorbed by the high-pressure compressor and the power absorbed by the low-pressure compressor is between 2 and 2.5 and the tip diameter of said first row of moving blades of said low pressure compressor is greater than the tip diameter of any other row of moving blades of either of said compressors, and the tip diameter of said low pressure turbine is greater than the tip diameter of said high pressure turbine.

2. An engine as claimed in claim 1 in which the high-pressure compressor is connected directly to said combustion equipment by an annular air passage, and in which the blade rows of the high pressure compressor have a constant tip diameter approximately equal to the outer diameter of said annular air passage.

3. An engine as claimed in claim 1 in which the low pressure compressor blade rows have substantially constant mean diameter.

4. An engine as claimed in claim 2 in which said combustion equipment comprises an annular combustion chamber which swells out externally and internally approximately equally from the mean radius thereof.

5. An axial flow turbojet engine in which the mean direction of flow of working fluid past any moving blade is substantially free from radial components comprising a casing; an air intake in said casing; a low-pressure multi-stage axial-flow compressor mounted in said casing, connected directly to said air intake to receive air therethrough and having a plurality of rows of moving blades whereof the first row has a hub tip ratio between 0.4 and 0.5, a high-pressure multi-stage axial-flow compressor mounted in said casing, and connected directly to said low-pressure compressor to receive substantially the whole of the air compressed by said low-pressure compressor; combustion equipment mounted in said casing and connected directly to said high-pressure compressor to receive substantially the whole of the air compressed by said high-pressure compressor; an axial-flow high pressure turbine having a single row of rotor blades, which high-pressure turbine is mounted in said casing, is connected directly to said combustion equipment to receive the products of combustion therefrom and is drivingly connected to said high-pressure compressor, the power developed by said high-pressure turbine being substantially wholly absorbed by said high-pressure compressor, an axial-flow low-pressure turbine having a single row of rotor blades, which low-pressure turbine is mounted in said casing and is drivingly connected to said low-pressure compressor, the power developed by said low-pressure turbine being substantially wholly absorbed by said low-pressure compressor; an annular duct connecting said low-pressure turbine directly to said high-pressure turbine to receive the exhaust therefrom; and an intermediate row of stationary guide blades in said annular duct; in which engine said turbines and said annular duct together define an annular gas passage for said products of combustion which diverges in the direction of flow of said products of combustion approximately equally on each side of its mean radius, and said stages of rotor blades of both said turbines and said intermediate guide blades have tips and roots inclined to conform to said annular gas passage; the ratio of the tip diameter of said low pressure turbine to the tip diameter of said first row of moving blades of said low pressure compressor being between 1 and 1.1; and the ratio between the power absorbed by the high pressure compressor and the power absorbed by the low-pressure compressor being between 2 and 2.5 and the tip diameter of said first row of moving blades of said low pressure compressor is greater than the tip diameter of any other row of moving blades of either of said compressors.

6. An axial flow turbojet engine comprising a casing; an air intake in said casing; a low-pressure multi-stage axial-flow compressor mounted in said casing, connected directly to said air intake to receive air therethrough and having a plurality of rows of moving blades whereof the first row has a hub tip ratio between 0.4 and 0.5, a high-pressure multi-stage axial-flow compressor mounted in said casing, and connected directly to said low-pressure compressor to receive substantially the whole of the air compressed by said low-pressure compressor; combustion equipment mounted in said casing and connected directly to said high-pressure compressor to receive substantially the whole of the air compressed by said high-pressure compressor; an axial-flow high pressure turbine having a single row of rotor blades, which high-pressure turbine is mounted in said casing, is connected directly to said combustion equipment to receive the products of combustion therefrom and is drivingly connected to said high-pressure compressor, the power developed by said high-pressure turbine being substantially wholly absorbed by said high-pressure compressor, an axial-flow low-pressure turbine having a single row of rotor blades, which low-pressure turbine is mounted in said casing and is drivingly connected to said low-pressure compressor, the power developed by said low-pressure turbine being substantially wholly absorbed by said low-pressure compressor; an annular duct connecting said low-pressure turbine directly to said high-pressure turbine to receive the exhaust therefrom; and an intermediate row of stationary guide blades in said annular duct; in which engine said turbines and said annular duct together define an annular gas passage for said products of combustion which diverges in the direction of flow of said products of combustion approximately equally on each side of its mean radius, and said stages of rotor blades of both said turbines and said intermediate guide blades have tips and roots inclined to conform to said annular gas passage; the ratio of the tip diameter of said low pressure turbine to the tip diameter of said first row of moving blades of said low pressure compressor being between 1 and 1.1; and the ratio between the power absorbed by the high pressure compressor and the power absorbed by the low-pressure compressor being between 2 and 2.5, shroud parts on the rotor blades of at least one of said turbines, said shroud parts together constituting a shroud ring, an adjacent ring on said casing, and a cylindrical rim projecting from one of said rings towards the other ring but spaced from said other ring by a suitable running clearance.

7. An engine as claimed in claim 6 wherein a frusto-conical shroud ring is provided with a rim around its leading edge side projecting radially outwardly to provide on its outer surface a cylindrical surface or edge spaced at a minimum running clearance from a cylindrical surface formed on the inside of said casing.

References Cited in the file of this patent

UNITED STATES PATENTS

| | | |
|---|---|---|
| Re. 23,198 | Anxionnaz et al. | Feb. 21, 1950 |
| 2,409,177 | Allen et al. | Oct. 15, 1946 |
| 2,505,660 | Baumann | Apr. 25, 1950 |
| 2,540,902 | Moore | Feb. 6, 1951 |
| 2,575,682 | Price | Nov. 20, 1951 |
| 2,599,470 | Meyer | June 3, 1952 |
| 2,608,821 | Hunsaker | Sept. 2, 1952 |

FOREIGN PATENTS

| | | |
|---|---|---|
| 879,123 | France | Nov. 10, 1942 |
| 687,108 | Germany | Jan. 23, 1940 |